United States Patent Office 3,597,419
Patented Aug. 3, 1971

3,597,419
ALKYLIDENEDIOXY-PROGESTERONE COMPOUND
Klaus Prezewowsky, Hermann Steinbeck, and Rudolf Wiechert, Berlin, Germany, assignors to Schering Aktiengesellschaft, Berlin and Bergkamen, Germany
No Drawing. Filed Feb. 27, 1969, Ser. No. 803,075
Claims priority, application Germany, Feb. 29, 1968,
P 16 68 688.7
Int. Cl. C07c 173/00
U.S. Cl. 260—239.55       9 Claims

ABSTRACT OF THE DISCLOSURE

A 16α,17-alkylidenedioxy-18-methyl - 19 - nor - progesterone compound having the formula

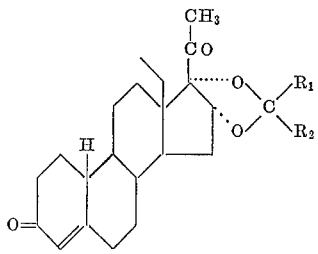

wherein $R_1$ and $R_2$ are the same or different and are hydrogen, alkyl having 1 to 4 carbon atoms, aralkyl, phenyl or substituted phenyl. The compounds have a high progestational action and in particular an action of protracted duration.

The compounds are made by condensing either:
(a) 16α,17 - dihydroxy - 18 - methyl - 19 - nor - 4-pregnene-3,20-dione or
(b) 16α,17 - dihydroxy - 3 - alkoxy - 18 - methyl - 19-nor - 1,3,5(10)-pregnatriene - 20 - one with a carbonyl compound of the formula

wherein $R_1$ and $R_2$ are the same or different and are hydrogen or alkyl having 1 to 4 carbon atoms and wherein $R_1$ and $R_2$ may also be aralkyl or phenyl or substituted phenyl in case the starting material is the compound at (a), which process in case that the starting material (b) is used is followed by further steps to convert the 1,3,5 (10)-pregnatriene-20-one to a 4-pregene-3,20-dione.

BACKGROUND OF THE INVENTION

Compounds with progestational activity are well known. A compound having a particularly high progestational action is 6-chloro-17α-acetoxy-4,6-pregnadiene-3, 20-dione. It is desired to obtain compounds with a still higher progestational action. In addition, it is of importance to obtain a protracted action of this kind. Slow release steroid compounds have already become known such as for instance 17-hexanoyloxy-19-nor-4-pregnene-3, 20-dione. It is therefore a further object of the present invention to provide for a compound having a still more pronounced extended progestational effect.

SUMMARY OF THE INVENTION

These objects are met by a 16α,17-alkylidenedioxy-18-methyl-19-nor-progesterone compound having the formula

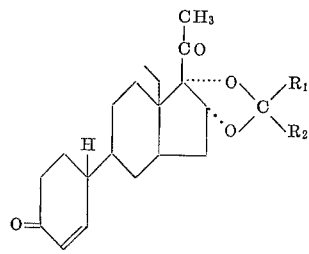

wherein $R_1$ and $R_2$ are the same or different and are hydrogen, alkyl having 1 to 4 carbon atoms, aralkyl, phenyl or substituted phenyl.

The invention also embraces the process of making the above compounds. The process comprises condensing 16α,17 - dihydroxy - 18 - methyl - 19 - nor - 4 -prognene-3,20-dione with a carbonyl compound of the formula

wherein $R_1$ and $R_2$ are the same or different and have the meaning as given above, the reaction being carried out in the presence of a strong acid, preferably a Lewis-acid.

The process of making may also start from 16α,17-dihydroxy - 3 - alkoxy - 18 - methyl - 19 - nor - 1,3,5(10-pregnatriene-20-one in which case the starting product is reacted with a carbonyl compound of the general formula

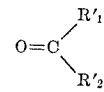

wherein $R'_1$ and $R'_2$ are the same or different and are hydrogen or alkyl having 1 to 4 carbon atoms, the condensing reaction being carried out in the presence of a strong acid, preferably a Lewis-acid, then reducing the 16α,17-alkylidenedioxy compound formed in the condensing step so as to convert the 20-ketone group to a 20-hydroxyl group; thereafter subjecting the latter compound to a reduction by the Birch method so as to form the Δ$^4$-20-ol compound; then subjecting the latter compound to treatment with an acid followed by an oxidation treatment so as to convert the Δ$^4$-20-hydroxyl compound to a Δ$^4$-20-keto compound.

DESCRIPTION OF THE PREFERRED EMBODIMENTS

The substituents in the phenyl radical of the final compound may particularly be halogen, lower alkyl, hydroxyl, alkoxy, nitro or amino groups.

Utility

The compounds of the invention have a high progestational activity as appears from the following Table I which compares the 16α,17-isopropylidenedioxy-18-methyl-19-nor-4-pregnene-3,20-dione of the invention with three prior-art compounds (I, II and III).

The progestational threshold value was determined in the conventional Clauberg test in infantile rabbits after oral application of the effective agent.

TABLE I

| No. | Compound | Limit value, gamma |
|---|---|---|
| I | 6-chloro-17α-acetoxy-4,6-pregnadiene-3,20-dione | 10–30 |
| II | 17α-ethinyl-17β-hydroxy-19-nor-4-androstene-3-one | 125 |
| III | 6α-methyl-17α-acetoxy-4-pregnene-3,20-dione | 100 |
| IV | 16α,17-isopropylidenedioxy-18-methyl-19-nor-4-pregnene-3,20-dione. | 3 |

In addition to the very high progestational activity, the compounds of the invention wherein $R_1$ and/or $R_2$ are aralkyl, phenyl or substituted phenyl have an excellent protracted action, as appears from the following Table II in which the compound of the invention, 16α,17-(1'-methyl-1'-phenyl-methylenedioxy)-18-methyl - 19 - nor-4-pregnene-3,20-dione (VII), is compared with two prior-art compounds identified as V and VI which are well known slow-release steroid compounds.

TABLE II

| No. | Compound | Dose (mg.) | Day | McPhail value |
|---|---|---|---|---|
| V | 17-hexanoyloxy-19-nor-4-pregnene-3,20-dione. | 4 | 3d | 2.3 |
| | | | 7th | 3.3 |
| | | | 10th | 3.8 |
| | | | 13th | 2.5 |
| | | | 17th | 1.8 |
| VI | 17-hexanoyl-4-pregnene-3,20-dione | 4 | 3d | 2.8 |
| | | | 7th | 3.2 |
| | | | 10th | 1.5 |
| | | | 13th | 1.0 |
| VII | 16α,17-(1'-methyl-1'-phenyl-methylenedioxy)-18-methyl-19-nor-4-pregnene-3,20-dione. | 0.8 | 3d | 2.5 |
| | | | 7th | 3.6 |
| | | | 10th | 3.8 |
| | | | 13th | 3.4 |
| | | | 17th | 1.5 |

As appear, the compounds of the invention (VII) have a substantially greater extended effect than the two comparison compounds (V and VI).

The values shown in Table II were determined on castrated female rabbits having a weight between 400 and 700 g. as follows.

The test animals were given subcutaneous injections of 5 μg. estradiol for a period of six days. From the seventh day, only one injection of the compound to be tested was effected and, in addition, 0.5 μg. of estradiol daily was administered. Two of the animals each were killed on the following days after the injection had been started: on the third, seventh, tenth, thirteenth and seventeenth day. The secretional transformation of the endometrium was appraised on the McPhail scale by means of histological preparations of the cornus of the uterus.

The compounds of the invention are suitable for treatment, if desired in combination with estrogens. A number of gynecological disturbances, such as oligo- and hypermenorrhea, anovulatory cycles, premenstrual complaints, dysmenorrhea, endometriosis, dysfunctional bleeding, etc. The compounds of the invention may be applied preferably by oral administration but may also be applied by subcutaneous, intravenous or intramuscular administration.

Pharmaceutical compositions

Compounds of the invention can be used in pharmaceutical compositions by combining them with the usual carrier substances as are conventional in galenic pharmacy. They may be compounded into the desired final form of use, for instance as lozenges, pills, tablets, coated tablets, capsules, etc. The compounds of the invention can of course also be used in pharmaceutical compositions which are in the form of liquid preparations suitable for injection. The making of these latter compositions likewise follows the usual methods as are conventional in galenic pharmacy. For instance, the effective agent may be dissolved preferably in an oil, particularly sesame oil or castor oil. If desired, suitable diluents or solution-promoters such as benzylbenzoate may be added in order to increase the solubility in the solvent.

The compositions are preferably applied, in case of oral application, at a daily dose of 0.1 to 50 mg., preferably 1 to 20 mg. In case of parenteral application, the dose should be between 0.5 and 200 mg. per day. Injection may be intravenous, intramuscular or subcutaneous.

Process of making the compounds

The compounds of the invention may be made generally using conventional steps. For instance, 16α,17-dihydroxy-18-methyl-19-nor-4-pregnene-3,20-dione may be condensed in the presence of a strong acid, preferably a Lewis-acid, with a carbonyl compound of the general formula

wherein $R_1$ and $R_2$ are the same or different and are hydrogen, alkyl having 1 to 4 carbon atoms, aralkyl, phenyl or substituted phenyl.

An alternative way of making the compounds of the invention starts from 16α,17-dihydroxy-3-alkoxy-18-methyl-19-nor-1,3,5(10)-pregnatriene-20-one. This method is used for making the compounds wherein $R_1$ and $R_2$ in the final product have the meaning only of hydrogen or alkyl having 1 to 4 carbon atoms. The starting product in this case is again reacted with a carbonyl compound of the general formula

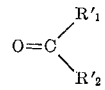

wherein $R'_1$ and $R'_2$ are the same or different and are hydrogen or alkyl having 1 to 4 carbon atoms. This condensing step is followed by reducing the 20-keto group, preferably by means of lithium-aluminum hydride or sodium-boron hydride, then reducing the A-ring by the Birch method, followed by treating the product obtained with an acid, and finally reconverting the 20-hydroxy group to the 20-keto group. The 20-hydroxyl group may be protected by a temporary blocking group prior to the reduction of the A-ring. The blocking group is preferably formed by a tetrahydropyranylether.

In the condensation reaction of the 16α,17-diol with the carbonyl compound, it is possible to use the latter both as condensation agent and as solvent. However, it is also possible to carry out the reaction in the presence of additional inert solvents, diluents or solution-promoters, such as dioxane, tetrahydrofuran, ethyleneglycoldimethylether and diethyleneglycoldimethylether.

The carbonyl compounds which can be used in the process of the invention are preferably the following: formaldehyde, acetaldehyde, acetone, methylethylketone, methylbutylketone, ethyl-butylketone, acetophenone, diphenylketone, methylbenzylketone, cyclohexanone, benzaldehyde, p-fluoroacetophenone, p-chloracetophenone and p-hydroxyacetophenone, etc.

The catalyst for the condensation should be a strong acid, particularly a Lewis-acid. Examples for instance are concentrated hydrochloric acid, sulfuric acid, p-toluenesulfonic acid, perchloric acid, boron trifluoride etherate, etc.

Usually a few drops of these catalytic acids are sufficient to carry out the reaction in a satisfactory manner.

The condensation can be performed usually under extremely mild reaction conditions. Normally, room temperature or a slightly increased reaction temperature and a reaction time between 1 and 8 hours are sufficient.

If the reaction starts from the 1,3,5(10)-pregna-triene-20-one as above described, that is, from a reaction material in which the A-ring is still present in its fully aromatic form, it is necessary to convert the aromatic ring by means of the conventional Birch reduction and subsequent acid treatment into the ultimate $\Delta^4$-3-keto group.

The reduction is preferably carried out by adding the solution of the steroid which is to be reduced dropwise to liquid ammonia which should be at a temperature between —50 and —70° C. The solvent for the steroid may be an inert organic solvent such as tetrahydrofuran or dioxane. An alkali metal, preferably metallic lithium, is then added batchwise to the reaction mixture. In order to carry out the reduction in the desired way, it is necessary in a preceding step to reduce the 20-keto group to a 20-OH group. This is done in the usual manner. The preferred reduction agent is lithium-aluminum hydride or sodium-boron hydride.

It is preferable to carry out the Birch reaction in a manner wherein the 20-hydroxyl group is protected by a blocking group. This blocking may be accomplished by an esterification, for instance by means of a lower carboxylic acid, such as acetic acid, or by etherification. It is particularly preferred to etherify the 20-hydroxy group with dihydropyran since the thus-formed tetrahydropyranyl ether can be particularly easily split off after completion of the Birch reduction. The subsequent reoxidation of the 20-hydroxy group is carried out in the usual manner such as customarily used for the oxidation of a secondary hydroxyl group. A particularly elegant manner of effecting the reaction involves the use of chromic acid-sulfuric acid in acetone or also chromic acid in pyridine.

Starting material

As has been pointed out, the reaction for making the compounds of the invention may start from two different types of starting material, to wit, 16α,17-dihydroxy-18-methyl-19-nor-4-pregnene-3,20-dione (I) and 16α,17-dihydroxy - 3-methoxy-18-methyl-19-nor-1,3,5(10)-pregnatriene-20-one (II). These two starting materials are likewise not known from the literature. The manner of making them shall therefore be discussed briefly as follows.

(I) 16α,17 - dihydroxy - 18 - methyl - 19 - nor - 4 - pregnene - 3,20 - dione. 800 mg. of 17β - hydroxy - 18 - methyl - 17α - ethinyl - 4 - estrene - 3 - one are dissolved in 8.5 ml. 2,4-lutidine. 0.81 ml. POCl$_3$ are added to the solution upon stirring, and the solution is at the same time heated in a nitrogen atmosphere to about 70° C. for seven hours. It is then left standing at room temperature overnight and thereupon poured onto ice, acidified with dilute sulfuric acid and extracted with ether. The ether extract is washed neutral with water, dried and concentrated by evaporation. The residue is subjected to chromatography on silica gel. There are thus obtained 330 mg. of 18-methyl-17-ethinyl-4,16-estradiene-3-one.

500 mg. of the latter material is dissolved in 9.9 ml. tetrahydrofuran/35 ml. methanol. The boiling solution of these components has added to it 1 ml. of a mercury-II-sulfate solution which has been made by heating 93 mg. of HgO, 1.75 ml. H$_2$O, and 0.08 ml. concentrated H$_2$SO$_4$ for 1½ hours to 65° C. After refluxing for one hour, the solution is concentrated in a vacuum. The concentrated solution is precipitated into a saturated NaCl solution and extracted with ether. The ether extract is washed with water, dried and concentrated and the residue is subjected to chromatography on silica gel. There are obtained 250 mg. of 18 - methyl - 19 - nor - 4,16-pregnadiene-3,20-dione.

A solution of 100 mg. of this material in 6 ml. acetone is reacted, upon cooling by ice, with 0.04 ml. acetic acid and, while vigorously stirring, with the solution of 59 mg. KMnO$_4$ in 1 ml. H$_2$O and 2 ml. acetone. Sodium sulfite solution is added after 10 minutes, and the solution is then filtered over celite, concentrated in a vacuum. The residue is taken up in methylene chloride. The organic phase is washed neutral with sodium bicarbonate solution and water, dried and concentrated by evaporation. There are thus obtained 70 mg. of 16α,17-dihydroxy-18-methyl-19-nor-4-pregnene-3,20-dione.

(II) 16α,17 - dihydroxy - 3 - methoxy - 18 - methyl-19-nor-1,3,5(10)-pregnatriene-20-one.

In order to obtain this starting material, one proceeds as follows. 3 - methoxy - 18 - methyl - 17α - ethinyl-1,3,5(10) - estratriene - 17β - ol, melting point 99.5–102° C., are made from 3-methoxy-18-methyl-1,3,5,(10)-estratriene-17β-ol by oxidation with chromic acid and reaction of the 17-keto thus obtained (M.P. 144–145° C.) in ethylene diamine with acetylene in the presence of dissolved lithium.

The thus-obtained 3 - methoxy - 18 - methyl - 17α-ethinyl - 1,3,5(10) - estratriene - 17β - ol is dissolved in 2,4-lutidine as solvent and is subjected to POCl$_3$ for 8 hours at 70° C. There is thus obtained 3-methoxy-18-methyl - 17 - ethinyl - 1,3,5(10),16 - estratetraene (M.P. 94–96° C.). The latter compound is converted by changing the 17-ethinyl group by an addition reaction with water upon catalysis by mercury-II-sulfate into the 17-acetyl group.

A solution is prepared of 1.05 g. of the thus-formed 3 - methoxy - 18 - methyl - 19 - nor - 1,3,5(10),16-pregnatetraene-20-one in 55 ml. acetone. 0.49 ml. formic acid and a solution of 520 mg. KMnO$_4$ in 3 ml. H$_2$O and 16.5 ml. acetone, which latter solution has been cooled to 0° C., are added to the acetone solution of the steroid at 0° C. in a nitrogen atmosphere. The excess KMnO$_4$ is destroyed by adding 750 mg. NaHSO$_3$ after 10 minutes, the NaHSO$_3$ being dissolved in 5 ml. H$_2$O. The solution is then subjected to filtration to remove the manganese dioxide. The filtration is done over celite. The filtrate is subjected to shaking with methylene chloride. The organic phase is then washed neutral, dried over sodium sulfate and concentrated by evaporation. There are thus obtained 350 mg. of 16α,17-dihydroxy-3-methoxy - 18 - methyl - 19 - nor - 1,3,5(10) - pregnatriene-20-one; M.P. 157–159° C. (acetone/hexane).

As appears from the foregoing discussion, the introduction of the 16α- and 17α-hydroxyl groups into the starting material is effective only in the last stage of the making of the materials by addition reaction with H$_2$O$_2$ in the $\Delta^{16}$-double bond position by means of potassium permanganate.

The thus-obtained 16α,17α-dihydroxysteroids above identified as I and II can be used without further purification as the starting materials for making the compounds of the invention.

To cover all angles it may, however, be mentioned that the starting material I, that is 16α,17-dihydroxy-18-methyl-19-nor-4-pregnene-3,20-dione can also be made by using the final product obtained in the process of the invention, that is 16α,17 - isopropylidenedioxy - 18 - methyl-19-nor-4-pregnene-3,20-dione, in splitting off from this product the 16α,17-isopropylidene residue. The purpose of this proceeding would for instance be to introduce a different alkylidenedioxy radical into the final product.

This alternative procedure may be exemplified as follows. 800 mg. of 16α,17-isopropylidenedioxy-18-methyl-19-nor-4-pregnene-3,20-dione are dissolved in 15 ml. formic acid (of a 100% concentration) at room temperature. 10 ml. of water is slowly added to the solution. The solution is then heated for about 20 hours to 42° C. The reaction mixture is then concentrated by evaporation to dryness in a vacuum and the residue is taken up in ether. The organic phase is washed neutral with water, dried over sodium sulfate, and the ether is then distilled off up to dryness. The thus-obtained 16α,17-dihydroxy - 18 - methyl - 19 - nor - 4 - pregnene - 3,20-dione can be used as the starting product in the present invention without further purification.

The following examples will further illustrate the invention.

EXAMPLE 1

A solution of 11 g. of 16α,17-dihydroxy-3-methoxy-18 - methyl-19-nor-1,3,5(10)-pregnatriene-20-one in 300 ml. acetone is reacted with a drop of perchloric acid. The solution is left standing for 5 hours at room temperature, whereupon 1 ml. of pyridine is added. After evaporation of the solvent in a vacuum, the residue is dissolved in methylene chloride. The solution is then washed neutral with water, dried and concentrated by evaporation. After purification of the residue by means of gradient chromatography on silica gel, there are obtained 6.8 g. of 3-methoxy-16α,17-isopropylidenedioxy-18 - methyl-19-nor-1,3,5(10)-pregnatriene-20-one; M.P. 186–188° C. (hexane/acetone).

A solution of 1.5 g. of the latter material in 60 ml. absolute tetrahydrofuran is then added to a suspension of 1.2 g. LiAlH₄ in 45 ml. absolute tetrahydrofuran upon cooling by ice. The ice cooling is continued upon stirring for another 30 minutes. Then, acetic acid ester is added dropwise in order to destroy the excess LiAlH₄. The solution is then reacted with methanol, and finally water is added. The thus-formed precipitate is extracted with acetic acid ester. The separated acetic acid solution is washed with water, dried and concentrated by evaporation. There is thus obtained a crude product consisting of 1.7 g. of 3 - methoxy - 16α,17 - isopropylidenedioxy-18 - methyl - 19 - nor - 1,3,5(10)-pregnatriene-20β-ol. A specimen in the amount of 200 mg. of the last-obtained product was subjected to recrystallization from methanol and was found to have a melting point between 137 and 138° C.

A solution of 1.6 g. of this last crude product in 50 ml. absolute benzene was then dried by subjecting it to azeotropic partial distillation. The solution was then reacted upon ice cooling in succession with 3 ml. of distilled dihydropyran and 11 mg. of p-toluenesulfonic acid. The reaction mixture was stirred for about 90 minutes at about room temperature and was then reacted with a few drops of pyridine in order to effect neutralization. The benzene solution was then washed neutral with water, dried and finally concentrated by evaporation to dryness. The residue was subjected to recrystallization from methanol. There were obtained 1.2 g. of 3-methoxy-16α,17-isopropylidenedioxy - 20β - tetrahydropyranyloxy-18 - methyl - 19 - nor - 1,3,5(10)-pregnatriene; M.P. 95–97° C.

500 mg. of the last-identified tetrahydropyranyloxy compound was then dissolved in 50 ml. of absolute tetrahydrofuran and were added at −70° C. to 50 ml. of liquid ammonia. 500 mg. lithium were then added in small batches to the reaction mixture. After completion of the addition, the mixture was subjected to stirring for 3 hours, whereupon 24 ml. ethanol were added dropwise. The ammonia was then evaporated and the residue was taken up in ether. The ether solution was washed with water a few times, then dried and evaporated and concentrated to dryness. The residue was taken up in order to split off the ether in 50 ml. methanol and 15 ml. methylene chloride with 0.1 ml. 3n-HCl and was left standing in this condition for 3 hours at room temperature. It was then taken up in methylene chloride, the solution was washed neutral with water and concentrated by evaporation. There was thus obtained a crude product consisting of 20β - hydroxy - 16α,17 - isopropylidenedioxy - 18-methyl - 19 - nor - 4 - pregnene-3-one.

50 ml. of the latter crude product were dissolved in acetone and reacted with 1 ml. Jones' reagent. The reaction mixture was stirred for about 5 to 10 minutes at 0–5° C., was then precipitated in water and extracted with ether. The ether solution was washed with water, dried and evaporated to dryness. The residue was purified through silica gel by means of gradient chromatogrphy. There were thus obtained 120 mg. of 16α,17-isopropylidenedioxy - 18 - methyl - 19 - nor-4-pregnene-3,20-dione; M.P. 204–205° C. (hexane/acetone). UV: $\epsilon_{239}=17.400$.

EXAMPLE 2

5 g. of 16α,17 - dihydroxy - 18 - methyl - 19 - nor-4-pregnene - 3,20 - dione were dissolved in 50 ml. distilled acetophenone and were reacted then with 0.7 ml. of 70% HClO₄. The mixture was subjected to stirring for 3 hours at room temperature. Thereafter, the mixture was reacted with 1 ml. pyridine and the excess acetophenone was expelled by water vapor distillation. The thus-obtained distillation residue was extracted with ether. The ether solution was washed with water, dried and finally concentrated by evaporation up to dryness. The residue was purified by gradient chromatogrphy through silica gel. There were thus obtained 0.8 g. 16α,17-(1'-methyl-1' - phenyl-methylenedioxy) - 18 - methyl - 19 - nor - 4-pregnene - 3,20 - dione; M.P. 177–179° C. (hexane/methylene chloride). UV: $\epsilon_{240}=16.800$.

EXAMPLE 3

A suspension was prepared of 400 mg. of 16α,17-dihydroxy - 18 - methyl - 19 - nor - 4 - pregnene-3,20-dione in a mixture of 15 ml. dioxane and 2.5 g. of p-nitroacetophenone. The mixture was reacted with 0.05 ml. 70% perchloric acid and then subjected to stirring at room tempearture for 4 hours. 1 ml. pyridine was then added to neutralize the mixture and the mass was thereafter subjected to concentration to dryness by evaporation in a vacuum. The excess p-nitroacetophenone was removed in a vacuum by water vapor distillation. The residue was purified by chromatography over silica gel and subjected to recrystallization in hexane/methylene chloride. There was obtained 16α,17-(1'-methyl-1'-p-nitrophenylmethylenedioxy) - 18 - methyl - 19 - nor-4-pregnene-3,20-dione.

In an analogous manner, 450 mg. of 16α,17-dihydroxy-18 - methyl - 19 - nor - 4 - pregnene - 3,20-dione with 3 g. of p-hydroxyacetophenone were reacted in the same way as above described. There was obtained 16α,17-(1'-methyl-1'-p-hydroxyphenylmethylenedioxy) - 18 - methyl-19-nor-4-pregnene-3,20-dione.

EXAMPLE 4

A suspension was prepared of 550 mg. of 16α,17-dihydroxy-18-methyl-19-nor-4-pregnene-3,20-dione in 15 ml. p-chloroacetophenone. The suspension was reacted with 0.075 ml. of 70% perchloric acid. After stirring for 2 hours at room temperature, the mixture was neutralized with 1 ml. pyridine, taken up in methylene chloride, washed with water and dried over Na₂SO₄. The solvent and excess p-chloroacetophenone were then distilled off in a high vacuum and the residue was purified by chromatography over silica gel. There was obtained 16α,17-(1'-methyl - 1' - p - chlorophenylmethylenedioxy)-18-methyl-19-nor-4-pregnene-3,20-dione.

What is claimed is:
1. A 16α,17 - alkylidenedioxy-18-methyl-19-nor-progesterone compound having the formula

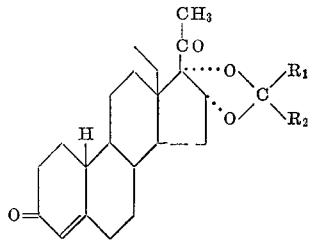

wherein R₁ and R₂ are the same or different and are hydrogen, alkyl having 1 to 4 carbon atoms, aralkyl, phenyl or substituted phenyl.

2. The progesterone compound of claim 1, wherein the substituents in the phenyl residue are selected from the group consisting of halogen, lower alkyl, hydroxyl, alkoxyl, nitro and amino.

3. The compound of claim 1 which is 16α,17-isopropylidenedioxy-18-methyl-19-nor-4-pregnene-3,20-dione.

4. The compound of claim 1 which is 16α,17-(1'-methyl - 1' - phenyl-methylenedioxy)-18-methyl-19-nor-4-pregnene-3,20-dione.

5. The compound of claim 1 which is 16α,17-(1'-methyl - 1' - p-nitrophenyl-methylenedioxy)-18-methyl-19-nor-4-pregnene-3,20-dione.

6. The compound of claim 1 which is 16α,17-(1'-methyl - 1' - p-hydroxyphenyl-methylenedioxy)-18-methyl-19-nor-4-pregnene-3,20-dione.

7. The compound of claim 1 which is 16α,17-(1'-methyl - 1' - p-chlorophenylmethylenedioxy) - 18-methyl-19-nor-4-pregnene-3,20-dione.

8. A pharmaceutical composition comprising an effective amount of a compound as defined in claim 1 and a pharmaceutically acceptable carrier therefor.

9. A pharmaceutical composition as defined in claim 8, which is in the form of a solution in an oil suited for parenteral injection.

References Cited

UNITED STATES PATENTS

| | | | |
|---|---|---|---|
| 3,326,902 | 6/1967 | Diassi | 260—239.55 |
| 3,008,958 | 11/1961 | Fried et al. | 260—239.55 |
| 2,941,998 | 6/1960 | Fried | 260—239.55 |

ELBERT L. ROBERTS, Primary Examiner

U.S. Cl. X.R.

424—241; 260—397.3, 397.4, 397.5